United States Patent [19]

Wichall

[11] 4,314,704
[45] Feb. 9, 1982

[54] ROTARY MECHANICAL FACE SEALS

[75] Inventor: Colin A. Wichall, Hampshire, England

[73] Assignee: Crane Packing Limited, Slough, England

[21] Appl. No.: 128,880

[22] Filed: Mar. 10, 1980

[51] Int. Cl.³ .......................... F16J 15/38; F16J 15/48
[52] U.S. Cl. ...................................... 277/27; 277/85; 277/105
[58] Field of Search .................... 277/81 R, 82, 84, 85, 277/92, 95, 105, 112, 116.2, 117, 118, 3, 27

[56] References Cited

U.S. PATENT DOCUMENTS

| 948,534 | 2/1910 | Trattner | 277/85 |
|---|---|---|---|
| 2,247,505 | 7/1941 | Kohler | 277/81 X |
| 2,365,046 | 12/1944 | Bottomley | 277/85 X |
| 2,408,314 | 9/1946 | Jacobsen | 277/85 |
| 2,408,315 | 9/1946 | Jacobsen | 277/85 |
| 2,420,718 | 5/1947 | Odelius | 277/85 X |
| 2,511,337 | 6/1950 | Jacobsen | 277/85 |
| 2,610,874 | 9/1952 | Payne | 277/81 X |

FOREIGN PATENT DOCUMENTS

| 1142329 | 2/1969 | United Kingdom | 277/85 |
|---|---|---|---|
| 1145448 | 3/1969 | United Kingdom | 277/85 |

*Primary Examiner*—Robert S. Ward, Jr.
*Attorney, Agent, or Firm*—Scrivener, Clarke, Scrivener and Johnson

[57] ABSTRACT

A rotary face seal located about a shaft and urged into seal face contact with a stationary seat formed on a housing which contains pressurized fluid. In order to overcome distortion of the seal due to the fluid pressure, which is likely to cause wear of the seal face, the seal is subjected to a radial compressive pre-stress applied between an elastomeric, e.g. rubber, strip and a support ring.

4 Claims, 1 Drawing Figure

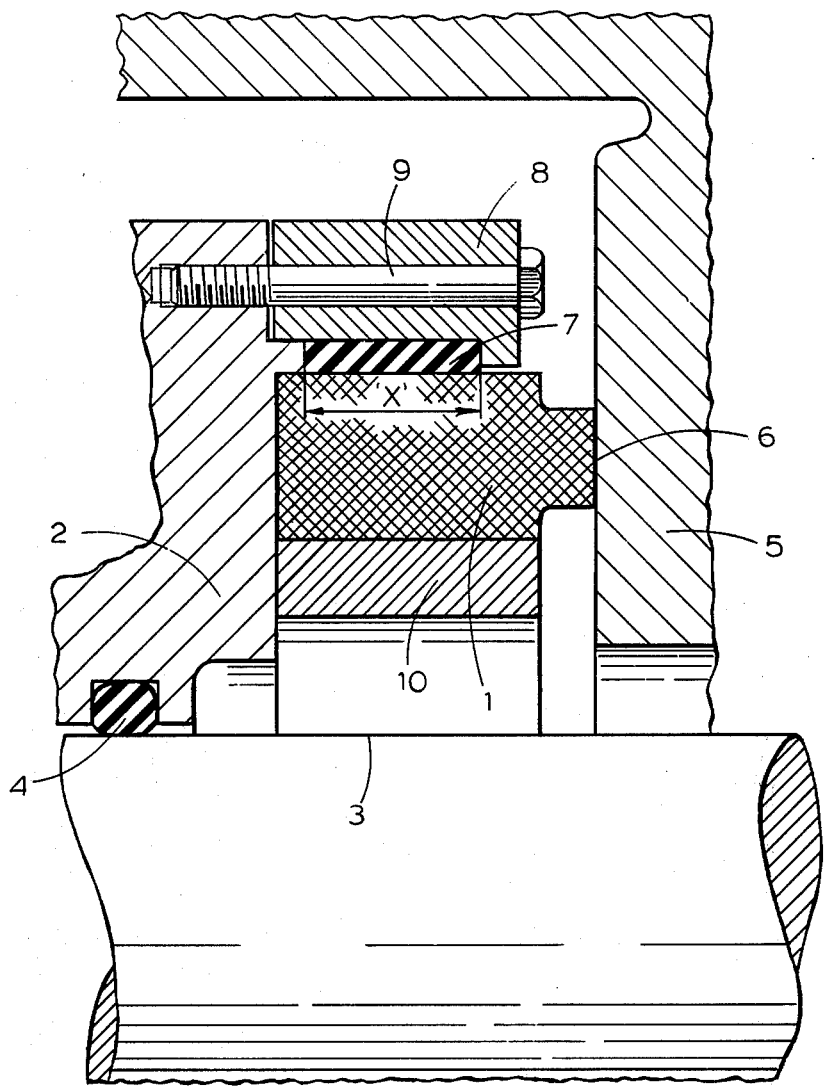

ROTARY MECHANICAL FACE SEALS

This invention relates to face seal assemblies for rotatable shafts.

In the design of large high pressure seals which are subjected to large fluctuations of the contained pressure, the elimination of distortion of the wearing rings or seal face members presents a major problem.

Such seal face members or wearing rings are normally manufactured in a material having low-friction characteristics and unfortunately most of the suitable materials have low mechanical strength and stiffness. Distortion of the ring by the fluid pressure can lead to tilting, and consequent dishing of the rubbing face, whereas perfect optical flatness is essential for consistent sealing properties.

The present invention arises from attempts to produce a construction in which the distortion under high pressure is kept to a minimum.

According to the invention a face seal assembly for a rotatable shaft comprises a seal face member located about the shaft in intimate contact with a relatively rotatable seat member, the seal face member, in use, being subjected to a pressure difference between areas which lie on opposite sides of the seal face such that this pressure difference tends to cause distortion of the seal face member, and the seal face member being stressed such that the distortion produced by the pressure difference is substantially counteracted. In this way, during assembly of the seal, the seal face member is subjected to a pre-stress which puts it under a permanently maintained mechanical load such that it is already at or somewhere near the maximum distortion which the fluid pressure for which it is designed would produce.

Preferably the seal face member is pre-stressed by applying a compressive stress to that member generally parallel to the seal face.

This pre-stress may be applied in one of a number of ways, generally involving some form of clamp. The member may be loaded onto or into a rigid member of much greater stiffness. For example, where the higher pressure side is on the outside of the member, the ring may be squeezed onto a rigid internal support ring. The compressive stress is preferably applied by squeezing the seal face member between a resilient member and a relatively inflexible support member. The resilient member may be an elastomeric sleeve and the relatively inflexible member may be a support ring.

Preferably the compressive stress is produced by applying to the support member a pressure of from 30% to 40% of the service pressure difference which tends to cause distortion of the seal face member.

According to a preferred embodiment of the invention, a face seal assembly for a rotatable shaft, comprises a seal ring located about the shaft and having a radially extending seal face, the seal ring being axially urged into intimate seal face contact with a relatively rotatable seat member, the seal ring being radially squeezed between a resilient member and a relatively inflexible support member such that substantially no distortion of the ring is produced when the seal ring is subjected in use to a radial fluid pressure difference.

The invention will now be described by way of example with reference to the accompanying drawing, which illustrates a section through part of a face seal assembly embodying the invention.

A rotating seal face member or wearing ring 1 of low-friction material, for example carbon, is mounted on a ring 2 sealed to a shaft 3 by a secondary seal in the form of an O-ring 4 that leaves the ring 2 free to be urged axially by means not shown so that the member 1 is urged into rubbing contact with a stationary seat 5 which may, for example, be mounted in, or form part of, a housing of a pump or other machine. The liquid which is within the housing, and against which the seal is acting, may be of varying pressure and this pressure, acting on the outside of the member 1 would, in the absence of the measures according to the invention, cause distortion of the member 1 such that its rubbing face 6, initially optically flat, would no longer be flat, leading to leakage and failure.

To overcome this, the member 1 is received in the sleeve 7 made of rubber strip and received in a recess in the inside of a compression ring 8. Initially the axial length X of the strip is greater than that of the recess so that when bolts 9 are tightened to secure the ring 8 to the mounting ring 2, the rubber strip 7 is compressed axially and, being trapped, can only expand radially inwards to pre-compress the seal face member 1.

The inward contraction of the member 1 is limited by the provision of a rigid inner metal support ring 10, which fits into the member 1. The proportions of the rubber strip 7 and its recess are chosen so that, when the bolts 9 are tightened, the member 1 is subjected to an inward compressive stress of the same order as that which would occur as the result of the maximum hydrostatic operating pressure which is to be expected within the housing. In this way, the member 1 is pre-stressed such that the distortion produced by the pressure difference is substantially counteracted.

Depending on the operating requirements, it may be desirable to set the degree of pre-compression as a proportion of the total deflection likely to occur, this being a design variable. In a typical example the degree of compression might be between 30 and 40 percent of that produced by the service pressure.

The pre-compression could be achieved by means other than the rubber strip 7, for example, by providing a taper fit between the inside of the ring 8 and the outside of the member 1. Instead of a strip of rubber 7, one could use an initially viscous compound, which sets solid. The main point is that, in some way, by distortion of rubber, by a taper fit, by direct mechanical loading, or any other means, the relatively weak seal face member is pre-stressed, preferably against a rigid surface. If the higher pressure side were to be inside instead of outside then the member would be pre-stressed outwards, into a rigid hoop of fixed dimensions.

I claim:

1. A face seal assembly comprising a rotatable shaft, a seat member located about the shaft, a seal face member located about the shaft with the seal face thereof in intimate sealing contact with the seat member, the seal face member and the seat member being arranged such that rotation of the shaft causes relative rotation between the seal face member and the seat member, said seal face member having a first side which in use is subject to a variable fluid pressure, and a second side which is opposite to said first side with said seal face lying between said first and second sides, a rigid support ring located about said shaft and being movable relative thereto, said support ring being disposed adjacent to said second side of the seal face member, and pre-stressing means arranged to press against said first side of the seal face member such as to pre-stress said seal face member against said support ring with a load related to said variable fluid pressure so that any distortion of said seal face member produced by variation in fluid pressure is substantially counter-acted.

2. A face seal assembly according to claim 1, in which the said pre-stressing means applies a compressive stress to the seal face member generally parallel to the seal face.

3. A face seal assembly according to claim 1, in which the said pre-stressing means comprises a resilient member and means to compress said resilient member in a direction generally parallel to said first side of the seal face member such that said resilient member expands in a direction generally perpendicular to said first side and thereby presses against it.

4. A face seal assembly according to claim 2, in which the said compressive stress applied to the seal face member by the pre-stressing means is produced by applying thereto a pressure of from 30% to 40% of the said differential fluid pressure.

* * * * *